(12) United States Patent  
Tran et al.

(10) Patent No.: US 9,291,491 B2  
(45) Date of Patent: Mar. 22, 2016

(54) WADING DETECTION SYSTEM FOR A VEHICLE

(75) Inventors: Thuy-Yung Tran, Coventry Warwickshire (GB); Edward Hoare, Coventry Warwickshire (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 208 days.

(21) Appl. No.: 13/994,492

(22) PCT Filed: Dec. 15, 2011

(86) PCT No.: PCT/EP2011/072999
§ 371 (c)(1),
(2), (4) Date: Jul. 24, 2013

(87) PCT Pub. No.: WO2012/080440
PCT Pub. Date: Jun. 21, 2012

(65) Prior Publication Data
US 2014/0293746 A1   Oct. 2, 2014

(30) Foreign Application Priority Data

Dec. 15, 2010 (GB) .................................. 1021268.6
Dec. 15, 2010 (GB) .................................. 1021272.8
Dec. 15, 2010 (GB) .................................. 1021278.5
Dec. 15, 2010 (GB) .................................. 1021295.9
Dec. 15, 2010 (GB) .................................. 1021296.7
Dec. 15, 2010 (GB) .................................. 1021297.5

(51) Int. Cl.
*G01S 15/00* (2006.01)
*G01F 23/00* (2006.01)
(Continued)

(52) U.S. Cl.
CPC ............ *G01F 23/00* (2013.01); *G01F 23/2962* (2013.01); *G01S 7/52004* (2013.01); *G01S 15/10* (2013.01); *G01S 15/872* (2013.01); *G01S 15/88* (2013.01)

(58) Field of Classification Search
CPC ....... G01S 15/00; G01F 23/2962; G01F 23/00
USPC .......................................................... 367/93
See application file for complete search history.

(56) References Cited

U.S. PATENT DOCUMENTS 5,173,692 A * 12/1992 Shapiro et al. ................ 340/943
5,521,594 A * 5/1996 Fukushima .................... 340/901
(Continued)

FOREIGN PATENT DOCUMENTS

DE         19718965 A1    11/1998
DE    10 2004 028157 B3    1/2006
(Continued)

OTHER PUBLICATIONS

International Search Report for PCT/EP2011/072999 dated Apr. 27, 2012, 6 pages.

*Primary Examiner* — Kerri McNally
(74) *Attorney, Agent, or Firm* — Reising Ethington P.C.

(57) ABSTRACT

A wading indicator system for a vehicle comprising: at least one sound wave pulse emitter device; at least one sound wave pulse receiver device; and a control unit. The control unit configured to measure one or more of the following variables: (i) the time of flight of a sound pulse between the at least one sound wave pulse emitter device and the at least one sound wave pulse receiver device; (ii) the amplitude of a sound pulse emitted by the at least one sound wave pulse emitter device when received by the at least one sound wave pulse receiver device; and (iii) the wavelength of a sound pulse emitted by the at least one sound wave pulse emitter device when received by the at least one sound wave pulse receiver device. Thereby the control unit is configured to determine whether at least a portion of the vehicle is immersed in water.

22 Claims, 8 Drawing Sheets

(51) Int. Cl.
*G01F 23/296* (2006.01)
*G01S 7/52* (2006.01)
*G01S 15/10* (2006.01)
*G01S 15/87* (2006.01)
*G01S 15/88* (2006.01)

(56) References Cited

U.S. PATENT DOCUMENTS 6,263,731 B1  7/2001  Getman et al.
8,473,173 B1*  6/2013  Robles ........................... 701/70
2005/0284218 A1*  12/2005  Lagergren .................. 73/290 V
2009/0159020 A1*  6/2009  Hall et al. ................... 123/41.11
2010/0257931 A1*  10/2010  Partington et al. .......... 73/290 V

FOREIGN PATENT DOCUMENTS

| | | | |
|---|---|---|---|
| GB | 2356602 A | 5/2001 | |
| WO | WO 03/002378 A1 | 1/2003 | |
| WO | WO 2005 121834 A1 | 12/2005 | |
| WO | WO 2009 013606 A2 | 1/2009 | |

\* cited by examiner

WADING DETECTION SYSTEM FOR A VEHICLE

TECHNICAL FIELD

This invention relates to a system for a vehicle, and particularly, but not exclusively to an indication or detection system, for the detection of a liquid, for example, water at a wading depth. Aspects of the invention relate to an apparatus, to a method, to a system, to a vehicle and to a program.

BACKGROUND

Road vehicles may be designed to travel through a body of water to a finite depth, which may be referred to as a maximum wading depth. Beyond this maximum wading depth there is a risk that the vehicle engine and electronics may be damaged. Identifying that a vehicle has entered a wading situation or is in a wading event is advantageous, optionally so that control systems of a vehicle can be deployed.

WO-A-03/002378 discloses the use of ultrasonic parking distance control (PDC) sensors to determine the likelihood of a vehicle being at least partially immersed in a liquid, such as water. Due to the detection of an object at approximately zero distance by more than one parking sensor, in conjunction with the detection of other conditions, for example vehicle speed and user selected "off-road" state; the system disclosed in WO-A-03/002378 is configured to determine that a vehicle is likely to be in a wading situation. It is recognized however that the detection of an object by more than one parking sensor simultaneously may be for reasons other than a wading event and that it is desirable to have a more positive determination that a vehicle is in a wading situation.

The present invention seeks to provide an improvement in the field of liquid, for example water, immersion detection systems that has particular application for vehicles. The invention may be utilised in applications other than for vehicles; for example, it is envisaged that embodiments of the invention may have application in buildings, for example domestic houses, where the automatic detection of water at a certain level may be useful. Such a system may be adapted, for example, to effect automatic deployment of flood defence systems.

SUMMARY

Aspects of the invention provide an apparatus, a system, a vehicle, a program and a method as claimed in the appended claims.

According to another aspect of the invention for which protection is sought, there is provided a system for detecting wading of a vehicle comprising: at least one sound wave pulse emitter device; at least one sound wave pulse receiver device; and a control unit configured to measure one or more of the following variables:
  (i) the time of flight of a sound pulse between the at least one sound wave pulse emitter device and the at least one sound wave pulse receiver device;
  (ii) the amplitude of a sound pulse emitted by the at least one sound wave pulse emitter device when received by the at least one sound wave pulse receiver device; and
  (iii) the wavelength of a sound pulse emitted by the at least one sound wave pulse emitter device when received by the at least one sound wave pulse receiver device.

Herein, the terms "sound wave pulse emitter device" and "sound wave pulse receiver device" are not intended to be limiting and may, in embodiments, conveniently be replaced by the terms "acoustic transmitter" and "acoustic receiver", respectively. Similarly, reference to "sound wave pulse" may conveniently be read as "acoustic pulse" or "acoustic signal".

Optionally, the control unit may be configured to determine whether the medium between the at least one sound wave pulse emitter device and the at least one sound wave pulse receiver device is air or liquid by comparing the one or more measured variables with a value or range of values expected for the one or more variables if the medium is air and/or by comparing the one or more measured variables with a value or range of values expected for the one or more variables if the medium is liquid.

Further optionally, the at least one sound wave pulse emitter and the at least one sound wave pulse receiver device are each ultrasonic transducer devices, each configured to emit an ultrasound pulse and each configured to receive an ultrasound pulse.

Optionally, the control unit may be configured to output a signal indicative of said medium being a liquid.

Additionally or alternatively, the at least one sound wave pulse emitter device and the at least one sound wave pulse receiver device may each transmit and receive in use, and wherein said control unit is configured to measure time of signal flight of a sound wave pulse emitted by each device.

Further optionally, said emitter and receiver devices may be configured to operate at different frequencies, so as to permit the signal emitted by one of said emitter and receiver devices to be distinguished from the signal emitted by another of said emitter and receiver devices.

Optionally, the value expected, of the time of flight of a sound pulse between the at least one sound wave pulse emitter device and the at least one sound wave pulse receiver device, if the medium is liquid may be between about 3 and about 5 times less than the value of the time of flight expected if the medium is air.

Optionally, the value expected of the wavelength of a sound pulse emitted by the at least one sound wave pulse emitter device when received by the at least one sound wave pulse receiver device, if the medium is liquid may be between about 3 and about 5 times greater than the value of the wavelength expected if the medium is air.

As a further option, the control unit may be configured to recall or reference the expected values of the said one or more variables from a memory associated with the control unit.

Optionally, the at least one sound wave pulse emitter device and the at least one sound wave pulse receiver device may be disposed such that they face one another or may be disposed such that they both face out from a common plane and/or may be disposed adjacent to one another or spaced apart.

In an embodiment, the or each sound wave pulse emitter device or sound wave pulse receiver device may comprise one or more conventional acoustic transducers, such as an ultrasonic parking distance control sensor, provided on the vehicle.

Optionally, the system may further comprise a depth sensor for determining water depth and/or a tilt sensor configured to indicate a vehicle fore and aft inclination, said control unit configured to predict depth of water at a pre-determined distance in advance of the vehicle.

As a further option, the depth sensor may comprise a substantially downward facing ultrasonic emitter device and a substantially downward facing ultrasonic receiver device configured to determine the distance between the depth sensor and a surface.

Optionally, said control unit may be configured automatically to cause the depth sensor to operate, but only when the medium between the at least one sound wave pulse emitter device and the at least one sound wave pulse receiver device has been determined to be liquid.

Additionally or alternatively, said control unit may be configured to calibrate the output of one or more parking distance control sensors, when the medium between the at least one sound wave pulse emitter device and the at least one sound wave pulse receiver device is determined to be liquid, so that the one or more parking distance control sensors are configured to indicate a range of an object at least partially submerged in liquid.

According to another aspect of the invention for which protection is sought, there is provided a vehicle comprising a wading indicator system as defined in the preceding paragraphs and comprising two series of ultrasonic transducers a first series disposed across the front of the vehicle and a second series disposed across the rear of the vehicle at a height suitable for indicating that the vehicle is in a wading situation.

Optionally, the two series of ultrasonic transducers may be each operable simultaneously, in conjunction with the control unit, as parking distance control sensors and wading situation sensors.

Further optionally, each series of ultrasonic transducers may be distributed across the vehicle and the location of each ultrasonic transducer may be known by the control unit, by being stored in a memory associated with the control unit and/or by being provided on a program executed by the control unit, such that the control unit is configured to determine that only a portion of the vehicle may be disposed in a liquid; to determine which portion of the vehicle that may be; and to approximate an inclination of the vehicle.

Optionally, the wading indication system is configured to repeatedly measure said one or more variables and is configured to determine that the medium between two or more ultrasonic transducers has changed from being a liquid to being air.

According to yet another aspect of the invention for which protection is sought, there is provided a method of determining the medium in which at least a portion of a vehicle is disposed, the method comprising:
 (i) emitting a sound wave pulse from at least one sound wave pulse emitter device disposed on the vehicle at a wading height;
 (ii) receiving said sound wave pulse using at least one sound wave pulse receiver device disposed on the vehicle at a wading height;
 (iii) measuring one or more of the following variables:
  (a) the time of flight of a sound pulse between the at least one sound wave pulse emitter device and the at least one sound wave pulse receiver device;
  (b) the amplitude of a sound pulse emitted by the at least one sound wave pulse emitter device when received by the at least one sound wave pulse receiver device; and
  (c) the wavelength of a sound pulse emitted by the at least one sound wave pulse emitter device when received by the at least one sound wave pulse receiver device; and
 (iv) comparing the one or more measured variables with a value or range of values expected for said one or more variables if the medium is air and/or by comparing the one or more measured variables with a value or range of values expected for the one or more variables if the medium is liquid.

According to yet another aspect of the invention for which protection is sought there is provided a wading indicator for a vehicle, said wading indicator comprising two or more ultrasonic emitter/receiver devices and a control unit adapted to measure the time of flight of an ultrasonic signal from one device to another.

Such an arrangement may allow the time of flight of sound in air to be distinguished from the significantly faster time of flight of sound in water, and accordingly the control unit may provide a suitable input, optionally to a vehicle data bus, indicative of the flight path of the ultrasonic beam being underwater.

Optionally, one or more pairs of devices may be successively pulsed in order to obtain two-way time of flight information, and thereby increase confidence of an underwater indication. In the alternative one or more devices is operated at a different frequency from one or more other devices so as to permit an ultrasonic signal in one direction to be distinguished from an ultrasonic signal in another direction.

A suitable device may be an ultrasonic distance sensor of a vehicle, particularly a parking sensor.

It will be appreciated that multiple parking distance control (PDC) sensors may be used both for parking distance control and in aspects of the present invention, so as to give an indication of vehicle wading at minimal additional cost. Moreover, the described aspects of the invention can be electronically enabled whilst the parking distance control system is also enabled, thus obviating any switching system. Nevertheless, the vehicle driver may be provided with a means of enabling or disabling a wading indicator according to the invention. The outputs from a distributed sensor array can indicate whether a portion of a vehicle is partly immersed, and thus the approximate inclination thereof.

Optionally, a vehicle may comprise a tilt sensor indicative of fore and aft vehicle inclination whereby the control unit may be adapted to give a predictive indication of water depth at a point ahead of the vehicle. Thus upon first sensing of water, the control unit may assume a constant angle of vehicle advance, and thus be able to give advance warning of the distance beyond which the safe wading depth of the vehicle will be exceeded, for example by message or graphic on the driver display. The control unit may also be adapted to prepare or enable other vehicle systems for deeper water. Similarly prediction of a vehicle leaving water may be made by this means, and thus give an appropriate indication to a driver, and/or prepare, and/or enable vehicle systems for dry land.

A change in vehicle fore and aft inclination may also be detected by continual sampling of a vehicle tilt sensor output(s), so that the control unit is adapted to give predictive information of a likely change in slope, and thus whether the slope is increasing or decreasing.

According to yet another aspect of the invention for which protection is sought, there is provided a method of indicating wading of a vehicle fitted with a plurality of ultrasonic emitter/receiver devices, the method comprising the steps of determining the time of flight in air of an ultrasonic signal from one device to another device repeatedly checking the time of flight when said devices are enabled, detecting a substantially reduced time of flight, and providing an input to a vehicle control system indicative of said substantially reduced time of flight, so as to indicate partial immersion of the vehicle.

Optionally, the method may also provide an input indicative of a resumption of normal time of flight, and include a delay so that a plurality of successive checks indicate a change of state. A typical time of flight in water may be three times or more, faster than a time of flight in air, and thus readily distinguishable.

It will also be appreciated that many pairs of devices may be linked in this method so as to indicate with confidence whether a vehicle is partly immersed in water, and to indicate which portions of the vehicle are immersed.

It will be appreciated that the step of determining the time of flight, may be performed repeatedly—for example upon turning of the vehicle ignition switch—or may be pre-determined and stored in a look-up table of a vehicle control system. Likewise the time of flight in water may be similarly pre-determined and held in a look-up table. Other suitable arrangements for storing and comparison of the sensed values are possible.

Optionally, the means and methods to be further described may provide a suitably enabled parking distance control sensor or sensors, and be used in conjunction with a tilt sensor to give predictive information to the driver, and to prepare or enable vehicle systems.

According to a further aspect of the invention for which protection is sought, there is provided a wading indicator of a vehicle that may comprise one or more appropriately enabled ultrasonic devices, a downwardly facing device of the same kind mounted higher on a vehicle, and a control unit configured to measure that the output of said downwardly facing device is within a prescribed range.

Such a downwardly facing device may for example be mounted on the vehicle bonnet, tailgate or boot lid at a distance above wading indicator sensors—which are typically at vehicle bumper level—and can detect the surface of water in which the vehicle may be partly immersed. The downward facing device(s) may be enabled only when the wading indicator sensors indicate immersion in water, so as to avoid false positive signals, for example from an animal passing beneath the downward facing device. The downward facing device is optionally mounted above the maximum wading depth of the vehicle, so as to avoid potential immersion thereof.

It will be appreciated that once enabled, the maximum distance between the high mounted device and the water surface will be known, and accordingly the output of the high mounted device can be considered highly reliable if falling within prescribed distance limits.

The control unit may further be configured to calculate the distance from the downwardly facing device to the surface of the water, thereby to allow the depth of water to be calculated. It will be appreciated that the latter step requires the arithmetical step of subtracting the measured distance from the known heights of the downward facing device above ground. This height may be stored in a look-up table of a vehicle control system.

According to yet another aspect of the invention for which protection is sought, there is provided a method of determining the depth of water in which a vehicle is partly immersed, and comprising the steps of determining that a vehicle is at wading depth by the use of one or more ultrasonic emitter/receiver devices, enabling a downwardly facing ultrasonic emitter/receiver device mounted high on the vehicle, determining that the distance sensed by said downwardly facing device is within a prescribed range, and providing an input to a vehicle control system indicative of said distance falling within said range.

Alternatively, or in addition, the method may include the steps of determining the distance sensed by said downwardly facing device, calculating the depth of water by reference to the height of said device above ground, and providing an input indicative of water depth to a vehicle control system.

In this specification reference to vehicle control systems, controllers and control units is intended to include any suitable electronic vehicle system or systems, typically including memory and processor functions. Reference in this specification to 'control unit' includes reference to any suitable controller for interpreting, translating and acting upon signals of a sensor. The control unit may comprise a distributed system and/or may be incorporated within a vehicle control system. Signals may be analogue or digital.

According to yet another aspect of the invention for which protection is sought, there is provided a vehicle having an ultrasonic emitter/receiver device, a means of indicating when said device is immersed, and a switching device to re-calibrate the output of said device between operation in air and in water.

Such an arrangement permits a conventional parking distance sensor to be used when immersed to detect underwater objects and the distance thereof from the sensor. It is well-known that the time of flight of an ultrasound signal is faster in water than in air, and accordingly re-calibration is required for the correct distance to be indicated.

This aspect of the invention permits underwater use of the sensor at minimal additional cost, and may be a substantial benefit in avoiding contact with underwater obstructions.

More than one parking distance sensor of a vehicle may be enabled according to this aspect, including both front and rear mounted sensors.

According to yet another aspect of the invention for which protection is sought, there is provided a method of detecting underwater objects from a vehicle having an ultrasonic emitter/receiver device may comprise detecting that said device is underwater, and recalibrating the output of said device for operation in water.

The method may further include the step of recalibrating the output of the device for operation in air when the device re-surfaces.

Calibrations may of course be held in a control unit of the vehicle, for example in a look-up table.

In an embodiment, the ultrasound device is itself the means of indicating that the device is immersed, using for example the means and methods already described. A downward facing device may provide the means of indicating immersion, by suitable water depth calculation.

Confidence in correct detection of partial immersion can be increased by reference to other vehicle systems, in particular electronic sensors indicative of vehicle attitude and movement.

Thus, for example, electronic inputs from vehicle sensors indicative of pitch and roll, such as downward firing sensors at the vehicle corners, may be combined and/or compared with signals indicative of partial vehicle immersion so as to gain increased confidence of signal accuracy, and to further modify vehicle response.

It will be understood that the dynamic response of a vehicle in water may be quite different from the dynamic response in air. Roll and pitch characteristics will significantly change due to the additional damping effect of water.

According to another aspect of the invention for which protection is sought, there is provided a vehicle having a movement sensor indicative of one of roll and pitch of the vehicle body, a wading sensor indicative of the vehicle being in one of air and at wading depth in water, and a comparator to indicate whether vehicle body movement is within a range associated with the output of said wading sensor.

This arrangement allows confirmation that vehicle movement (roll, pitch or a combination of both) is within a predetermined band, which may be contained with a look-up table of a vehicle control system. In the event that outputs from the sensors cannot be correlated, a warning may be indicated to the driver, or other vehicle actions may be automatically initiated.

In a development of this aspect, the vehicle may further include a sensor indicative of wading depth, and the comparator may select a permissible range according to the sensed wading depth.

In yet a further development, the vehicle may include a means of adjusting roll and/or pitch, and a controller thereof, said controller adjusting the response of the vehicle body according to the output of the wading sensor and/or the depth of water sensed. Such an arrangement may improve comfort and safety of persons with in the vehicle when wading, and improve vehicle traction.

Ultrasonic emitter receiver devices, such as parking distance control sensors, as described above, can provide a suitable indicator of wading and wading depth.

In yet another aspect of the present invention for which protection is sought there is provided a method of determining whether movement of a vehicle body is within a prescribed range, and comprising the steps of sensing whether the vehicle is in air or is wading, sensing body movement by detecting one of roll and pitch, comparing body movement with a range associated with movement in air and at wading depth, and indicating whether or not body movement is appropriate.

Movement in roll and pitch may be sensed to give an appropriate vector, and associated ranges may be provided for comparison.

The method may include the step of sensing wading depth above a minimum, and determining whether body movement is within a range associated with the sensed depth.

In yet another aspect, the invention provides a vehicle having an attitude sensor indicative of a vehicle body angle with respect to a horizontal plane, a wading sensor indicative of the vehicle being in one of air and at wading depth in water, and a comparator to indicate whether vehicle attitude is within a range associated with the output of said wading sensor.

Such a comparator may be used to confirm that the vehicle is at a safe attitude when wading, the permissible range of attitudes being for example much less than when on dry land. The attitude sensor may comprise a mathematical combination of the outputs of two or more individual sensors, for example fore and aft, and side to side tilt sensors.

A sensor indicative of wading depth may be included, the permissible range of attitudes being different according to the detected wading depth.

Detected wading depth may be an average of depths detected around the vehicle, or may be the maximum detected depth.

The permissible range(s) may be determined in advance, and retained in a look-up table of a vehicle control system.

In yet another aspect, the invention provides a method of determining whether attitude of a vehicle body is within a prescribed range, and comprising the steps of sensing vehicle attitude, sensing whether the vehicle is in air or is wading, comparing vehicle attitude with a range associated with permissible attitude in air and at wading depth, and indicating whether vehicle attitude is appropriate.

The method may further include the step of sensing wading depth above a minimum, and determining whether vehicle attitude is within a range associated with the sensed depth.

An ultrasound emitter/receiver device such as a parking distance control sensor or sensors, as described above may be advantageously used as sensors of wading and wading depth. Conventional vehicle devices such as low-g accelerometers and gyroscopes can be adapted to give information about instant vehicle attitude, for example fore and aft tilt, and side to side lean.

Various aspects of the present invention relate to ultrasonic devices, vehicles and methods of use. It will however be appreciated that the inventions may be retrofitted to existing vehicles as a combination of hardware and software. Such means may adapt an existing vehicle with parking sensors to detection of wading or wading depth. In this specification use of the term 'wading depth' indicates wading at a depth sufficient to be detected by appropriately mounted parking sensors, but does not indicate any particular depth, nor that any vehicle with parking sensors can be adapted to wade merely by adaptation of the sensor controller. As is well understood, many aspects of a vehicle may require modification to ensure successful wading, but the disclosed devices and methods provide a convenient and economical way of establishing wading and the depth of wading.

Within the scope of this application it is envisaged that the various aspects, embodiments, examples, features and alternatives set out in the preceding paragraphs, in the claims and/or in the following description and drawings may be taken independently or in any combination thereof. For example, features described with reference to one embodiment are applicable to all embodiments unless there is incompatibility of features.

Reference in this specification to 'control unit' includes reference to any suitable controller for interpreting, translating and acting upon signals of a sensor. The control unit may comprise a distributed system and/or may be incorporated within a vehicle control system. Signals may be analogue or digital.

BRIEF DESCRIPTION OF THE DRAWINGS

Embodiments of the invention will now be described, by way of example only, with reference to the accompanying drawings in which.

DETAILED DESCRIPTION OF EMBODIMENTS

Detailed descriptions of specific embodiments of the apparatus, system, vehicle, program and method of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the apparatus, system, vehicle, program and method described herein may be embodied in various and alternative forms. The figures are not necessarily to scale and some features may be exaggerated or minimized to show details of particular components. Well-known components, materials or methods are not necessarily described in great detail in order to avoid obscuring the present disclosure. For example, the program executed by the control unit can be implemented as a non-transient computer readable memory on which the program is stored, including such things as magnetic media, optical media, or any suitable type of RAM or ROM, as is known in the art. Any specific structural and functional details disclosed herein are not to be interpreted as limiting, but merely as a basis for the claims and as a representative basis for teaching one skilled in the art to variously employ the invention.

Figure 1A:
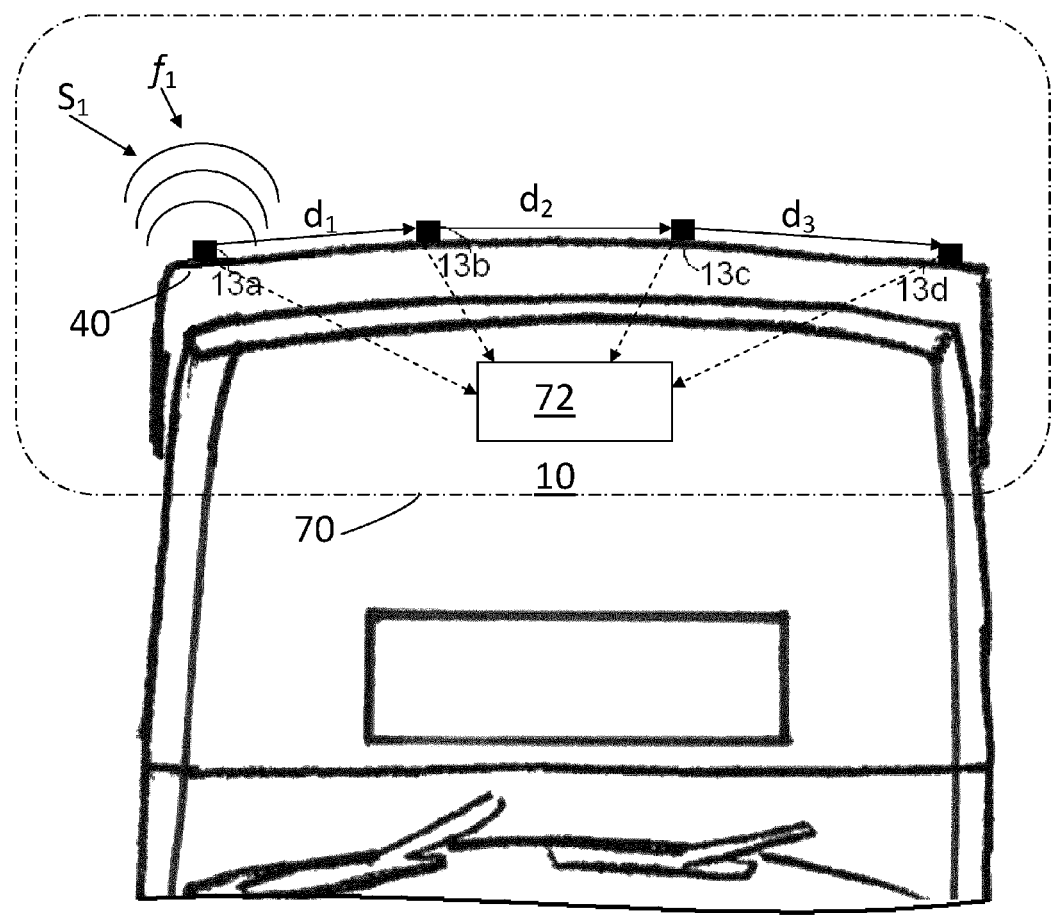
FIG. 1A is an illustration of part of a vehicle in plan view showing an arrangement of sensors on a front bumper of the vehicle.

Referring to FIG. 1A, a vehicle 10 is illustrated having a system 70 for indicating or determining whether at least a portion of the vehicle 10 is disposed in a liquid such as water 21. The system 70 comprises a processing unit or control unit 72 and two or more sensors that are coupled to the processing unit 72. The processing unit 72 is configured to at least receive electrical signals issued by the sensors and process them. The processing unit may additionally be configured to issue electrical signals to the sensors to control them. Optionally the system 70 comprises eight sensors positioned four on the front bumper 40 and four on the rear bumper (not shown). The sensors may optionally be or include transducers (that can optionally convert acoustic signals to electrical signals and vice versa) 13a, 13b, 13c, 13d, that may preferably, but nevertheless optionally, be ultrasonic transducers. A series of four sensors 13a, 13b, 13c, 13d is illustrated in FIG. 1A disposed in a linear configuration extending across the width of the front bumper 40. A further set of four sensors (not shown) may be similarly arranged on the rear bumper of the vehicle 10.

It will be understood that a greater or fewer number than four sensors may be used in other embodiments. Optionally at least two sensors may be provided. The arrangement of the sensors 13a, 13b, 13c, 13d is optional and a roughly linear configuration is shown merely for illustration purposes. In other embodiments, the sensors 13a, 13b, 13c, 13d may be arranged in a non-linear configuration and/or may be positioned at more than one height across the vehicle 10; and/or may be disguised or occluded from normal view for stylistic and/or other purposes. In use, the sensors operate in pairs and one or more pairs of sensors may be disposed below a bumper level to give an even earlier indication that a vehicle is dispose in water. The sensors 13a, 13b, 13c, 13d illustrated each face out from a common plane of the front bumper 40, however in other envisaged embodiments, a pair of sensors may face one another (such sensors would not also be capable of being utilised as parking control distance sensors), but nevertheless would be usefully operational as sensors issuing and receiving acoustic signals.

Furthermore, whereas the present embodiment is described as utilising ultrasonic transducers it will be understood from reading the foregoing that other suitable types of sensor or transducer may be used in alternative envisaged embodiments. For example, other ranges of acoustic transducer sensor such as an audible sound wave transducer may be used. The terms ultrasound and ultrasonic are used synonymously in the foregoing to mean sound waves of a frequency that is outside of the typical human-hearing range, optionally taken to be greater than about 20 kHz and further optionally about 50 kHz. It will be understood that the present invention may be effectively employed using sonic sensors that emit and receive sound waves at frequencies lower than 20 kHz.

Ultrasonic sensors such as those currently used for parking distance control (PDC) typically comprise a diaphragm that can oscillate or vibrate that is disposed to face out from a vehicle bumper 40; a piezoelectric element positioned behind the diaphragm; and an integrated circuit. The same diaphragm may be used to emit an ultrasonic signal (in the form of sound waves) and receive an ultrasonic signal. The emission of ultrasonic signals, waves or pulses is typically controlled by the integrated circuit, which may optionally issue electrical signals to an electronic control unit 72 for processing. In normal use as a parking sensor, the timing difference between the transmission of an ultrasonic pulse and receipt of a reflection of that same ultrasonic pulse can be used to measure the range or distance between the vehicle and an object in the vehicle path.

Aspects of the present invention optionally control and utilise an interaction between two or more sensors to determine whether one or more of the sensors is disposed in water. The expected interaction between two or more sensors in air will be different to the expected interaction between two or more sensors in water and by monitoring the interaction between two or more sensors, the system 70 is able to determine quickly and with a reasonably high-degree of certainty that a portion of the vehicle 10 is disposed in water (or another liquid, for example dirty, water, mud or salt water).

The sensors 13a, 13b, 13c, 13d are optionally each ultrasonic emitter/receiver devices. As such an optional but nevertheless beneficial aspect of this embodiment of the invention is that ultrasonic sensors that may currently be installed on vehicles to operate as parking aids can be utilised in application of the present invention without the need to install additional hardware devices on a vehicle. The installation of a new device on the front of a vehicle may not be a trivial matter once consideration is given to at least some of the following: approval for safety; performance testing in various conditions (e.g. wet, dirty, cold, hot, fast); stylistic requirements; change in manufacturing process and cost. However, it will be understood that the system 70 of the present invention may comprise additional or alternative sensors to PDC sensors.

The longitudinal velocity of ultrasound or ultrasonic waves in air $v_l(air)$ is between about 300 m/s and about 350 m/s and the speed of ultrasound or ultrasonic waves in water $v_l(water)$ is between about 1450 m/s and 1600 m/s. The difference in the longitudinal velocity of the sound waves in air and water is, at least in part, due to the very different intrinsic acoustic Impedances (Z) of air and water respectively. The speed or longitudinal velocity of sound waves in air and water provided here are approximate and the actual velocity may be dependent upon a number of factors, for example, pressure, temperature and water salinity. Nevertheless, there is a significant, difference in the propagation properties of sound and ultrasound in air compared to water. Sound waves and ultrasound waves propagate more quickly in water than they do in air. Furthermore a sound wave pulse of a specific amplitude (sometimes referred to as intensity) will be impeded (sometimes referred to as attenuated) differently in air compared to water. Sound waves of the same frequency and amplitude may propagate further in water than in air. The difference in speed and/or distance and/or the difference in other acoustic behavioural characteristics, for example wavelength, that differ in air and water are utilised by the system 70, to identify a change in medium in which one or more of the sensors 13a, 13b, 13c, 13d are disposed and/or to determine the medium (air or water) that one or more of the sensors 13a, 13b, 13c, 13d are disposed in. The system 70 does this by monitoring the signal emitted by a first sensor 13a and the signal received by a second sensor 13b and noting a measurable change in one or more variables of the received signal.

Referring again to FIG. 1A the propagation of an ultrasound wave pulse $S_1$ emitted by a first ultrasonic transducer 13a, is illustrated schematically. The sound wave pulse $S_1$ emitted by the first sensor 13a is at a first frequency $f_1$ (known and/or determined by the system 70); at an amplitude $A_1$ (known and/or determined by the system 70); and for a duration of $t_1$ (known and/or determined by the system 70). The frequency $f_1$ may be determined by the frequency of an oscillating (for example sinusoidal) electrical signal applied across the piezoelectric material. The amplitude $A_1$ of the sound pulse $S_1$ will be determined by and proportional to the voltage applied across the piezoelectric material. In air, the longitudinal velocity vl(air) of the sound wave pulse $S_1$ will be different to the longitudinal velocity vl(water) of the same sound wave pulse $S_1$ in water. As such the system 70 may be configured and calibrated so that when the first transducer issues a sound wave pulse $S_1$ at least one of the other transducers, for example, a second sensor or transducer 13b will receive at least a portion of that signal. The time taken for the sound pulse $S_1$ signal emitted from the first sensor 13a to arrive at and be received by the second sensor 13b will depend upon the distance $d_1$ between the two sensors 13a, 13b and upon the propagation speed of sound in the medium that is between the first and second sensors 13a, 13b. The time taken for the sound pulse $S_1$ signal emitted from the first sensor 13a to arrive at and be received by the second sensor 13b may be referred to as the Time-of Flight (TOF). The Time of Flight provides a variable that is measurably different in air and water. As such by monitoring the electrical signals issued to the first sensor 13a and generated by the second sensor 13b, the control unit 72 of the system 70 can identify with a high-degree of accuracy what medium those sensors (and therefore at least a portion of the vehicle 10) are disposed in.

Example of Time-of-Flight Measurement

The system 70 may be configured to expect that a sound wave pulse $S_1$ issued by the first transducer 13a will be received by the second transducer 13b within a certain time range. For example, taking $d_1$ to be 0.7 m and taking the longitudinal velocity $v_l$(air) of the sound wave pulse $S_1$ in air to be between about 300 m/s to 350 m/s, then the time-of-flight TOF(air) for a sound wave pulse $S_1$ to travel between the first transducer 13a and the second transducer 13b will be between about 2 ms and 2.3 ms. In contrast, taking the longitudinal velocity $v_l$(water) of the sound wave pulse $S_1$ in water to be about 1450 m/s to about 1600 m/s then the time-of-flight TOF(water) for a sound wave pulse $S_1$ to travel between the first transducer 13a and the second transducer 13b when the transducers are disposed in water will be between about 0.43 ms and about 0.5 ms.

The first transducer 13a will be intermittently pulsed by an oscillating electrical signal (for example a sinusoidal electrical signal). Optionally, the first transducer may be operated once per second. Almost immediately, the electrical signal is applied to the piezoelectric element will generate a pulse of ultrasonic sound waves. Meanwhile the electrical signal generated by the second transducer 13b will be issued to the processing unit 72. The processing unit will monitor the received signals and if a signal is received a certain timeframe, it will be known that the vehicle is in water, whereas it the signal is received within a different, later, time frame, it will be known that there is air between the first and second sensors 13a, 13b.

Additionally, or alternatively, other characteristic variables of the first and second sensors 13a, 13b may measurably differ due to the medium disposed between them. Beneficially, the variables may change in a specific way depending upon the type of medium between the sensors 13a, 13b and the actual value of the measured variable can be used to identify that the vehicle is disposed in a certain medium, for example, water.

The system 70 may be configured to exploit any one or more of the following:

(i) the sound wave pulse $S_1$ emitted by the first transducer is received within a specific time range by one or more of the other transducers 13b, 13c, 13d in gas (for example air) and within a different yet specific time range in liquid (for example water);

(ii) the sound wave pulse $S_1$ emitted by the first transducer is receivable at all by any of the other transducers 13b, 13c, 13d in air (gas), but is receivable by one or more of the other transducers in water (liquid);

(iii) at least a portion of the sound wave pulse $S_1$ emitted by the first transducer is receivable by one or more of the other transducers 13b, 13c, 13d and the received sound wave pulse has an amplitude and/or wavelength in a known expected range in air and a different yet known expected range in water.

Each of these characteristics and optionally additional characteristics are measurable and substantially different in air and water. One or more of them may be used by the system 70 to determine the environment of each sensor.

Figure 1B:
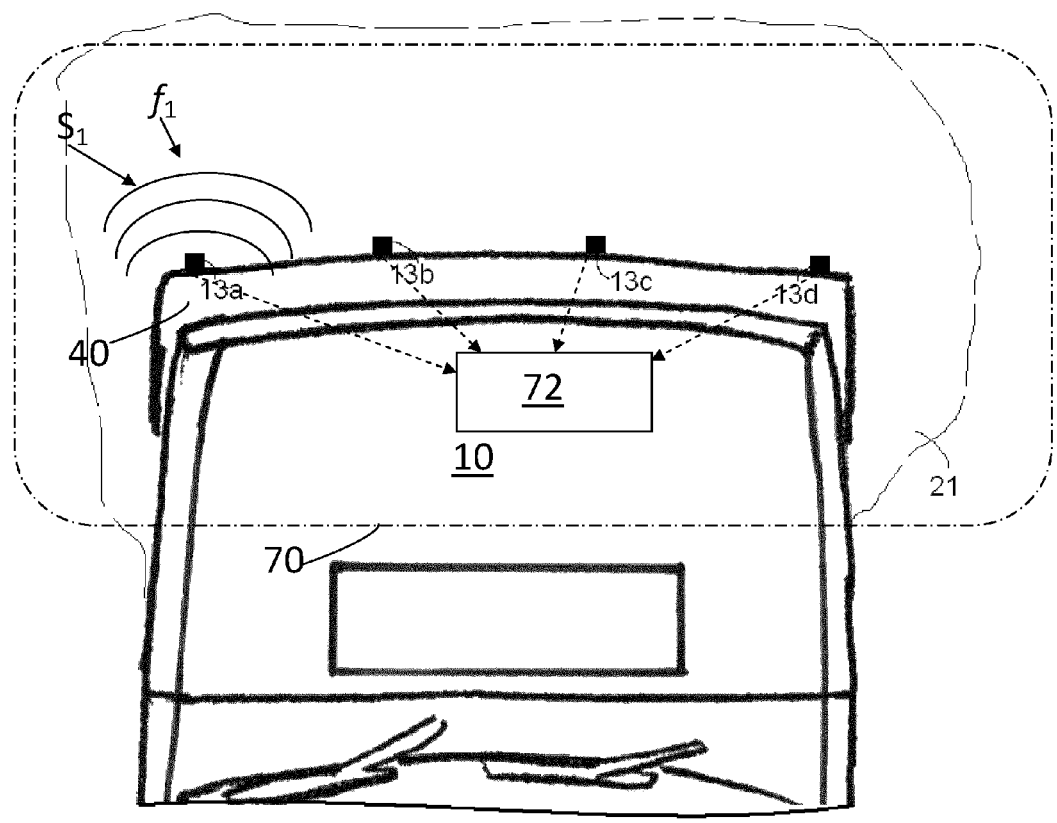
FIG. 1B is an illustration of the vehicle of FIG. 1A wherein the vehicle is partially immersed in liquid, for example water.

Referring now to FIG. 1B, it can be seen that the vehicle 10 is at least partially disposed in water 21 and each of the four transducers 13a, 13b, 13c, 13d is immersed in water. The time of flight from emission at one sensor 13a to detection at another sensor 13b may be measured in air, and recorded in, for example, a look-up table stored in the memory of the processing unit or control system 72. The time of flight between the same pair of sensors in water, will be so much shorter that it will give a reliable indication of immersion.

Several pairs of sensors may give simultaneous time of flight information. For example, a first pair comprising first sensor 13a and second sensor 13b may be operated and the TOF of path $d_1$ monitored in one or both directions, whilst at the same time a second pair comprising third sensor 13c and fourth sensor 13d may be operated and the TOF of path $d_3$ monitored in one or both directions. In this way, the system 70 may be configured to glean spatial information about the water in which the vehicle 10 is disposed. For example, if the monitored TOF of path $d_1$ is indicative of air between the first pair of sensors 13a, 13b but at the same time, the monitored TOF of the path $d_3$ is indicative of water between the second pair of sensors 13c, 13d, the system may optionally determined that the because the left-hand side of the vehicle 10 is not immersed in water whereas the right-hand side of the vehicle 10 is immersed in water that the vehicle 10 is on an uneven surface and is inclined to the right.

In a further embodiment, the system 70 may be configured to expect a certain time-of-flight in air TOF(air) for each specific path (for example a first path $d_1$ between the first transducer 13a and the second transducer 13b; a second path ($d_1$+$d_2$) between the first transducer and the third transducer 13c and so on) and a significant deviation from each of the expected times-of-flight in air TOF(air) can be used to determine that one or more of the transducers 13a-13d is not in air. For example an algorithm executed by the processing unit 72 of the system 70 may be configured to make a reasonable determination of the presence of water based on the following logic:

Is measured TOF within allowable tolerance of expected TOF(air)?

If yes then vehicle is in air, if no then vehicle is in water.

Alternatively, or additionally, an algorithm executed by the processing unit 72 may recall stored expected values of the TOF(air) and TOF(water) and perform the further following logic:

If measured TOF is not within accepted tolerance for air, is measured TOF within accepted tolerance for TOF(water)?

If yes, then vehicle is in water, if no, then further monitoring is required before determination is made.

It will be understood from reading the foregoing that the system 70 may utilise different sequences of logic steps in an algorithm and/or a variety of statistical comparison techniques to decide whether the measured TOF means that the transducers of a measured path are disposed in air or in water.

Alternatively, or additionally, the amplitude of a received sound wave pulse may be used to determine whether a pair of transducers is disposed: in air; not in air; or in water. The distance $d_1$ between the first transducer 13a and the second transducer 13b may optionally be about 0.7 m. At that range the amplitude of the sound wave received $A_{1R}$ by transducer 13b may be significant enough to oscillate the diaphragm of the transducer 13b and create an electrical signal having an amplitude that is proportional to the amplitude of the sound wave received $A_{1R}$ by transducer 13b. That amplitude $A_{1R}$ may be measurably different if the sensors 13a and 13b are disposed in water compared to that amplitude $A_{1R}$(air) when the sensors 13a and 13b are disposed in air. The processing unit 72 of the system 70 may be configured to detect that difference and from that determine that at least a portion of the vehicle in the region of sensors 13a and 13b is disposed in water having a depth at least as high as the height of sensors 13a and 13b. The amplitude in water will be significantly higher due to, inter alia, the lower acoustic impedance of water.

It will be understood that based upon the number of sensors, the number of paths taken by sound wave pulses issued by each sensor and received by each sensor that the processing unit 72 may be performing a significant processing of the data received from each of the sensors, in real-time, to determine and monitor the current state of the vehicle 10 vis-a-vis the environment. One or more algorithms carried out by one or more processors of the processing unit 72 can be used to continuously sample or intermittently sample the electrical signals issued by the two or more sensors and use that data as well as data about the issued signals and optionally use expected data to compare the timing of received pulses, the amplitude of received pulses and/or the wavelength of the received pulses by each of the sensors. Optionally, the processing unit 72 may conduct more than one monitoring and comparing process and each of the monitoring and comparing processes may be limited to one or a few specific paths. As such the processing unit may monitor the interaction between pairs of sensors in only one direction or the interaction between pairs of sensors in both directions.

In a further optional embodiment of the invention, one or more or each sensor may emit sound wave pulses at a specific and different frequency compared to the frequency of the other of the one or more sensors. In this way, the sound wave pulse $S_1$ emitted by the first transducer 13a, may be uniquely identifiable. Likewise the other sensors may each also emit a uniquely identifiable sound wave pulse. This information may provide the system 70 with sufficient data to make determinations about which sensors are disposed in water. For example, if the vehicle 10 is travelling on an inclined surface such that the vehicle is tilted to the left, the first and second transducers 13a, 13b may be disposed in water and the other transducers 13c,13d (and optionally also the rear transducers) may not be disposed in water. This determination could be used by a more general control system of the vehicle 10 monitoring the environment of the vehicle and advising the driver how to proceed.

In another embodiment of the invention, the sound wave pulse $S_1$ emitted by the first transducer is not receivable by at least one of the other transducers, for example, the furthest transducer 13d or optionally all of the other transducers 13b, 13c, 13d when in air. This may be due to the impedance of air and/or the amplitude of the emitted signal not being sufficient to reach a transducer (e.g. 13c) at a specific range (e.g. $d_1$+$d_2$+$d_3$). However, when the vehicle 10 is positioned in water 21 (optionally as illustrated in FIG. 1B) the sound wave pulse $S_1$ from the first transducer may be received or "heard" by the other one or more transducers. The effect of the water may be referred to as hydraulic coupling. The water having a lower acoustic impedance and/or allowing a different propagation characteristic of the same emitted sound wave pulse $S_1$ can be utilised by the system 70 to determine the environment of the vehicle 10. It will be understood that the sensors being disposed in water may increase the amplitude of a received sound wave pulse and that a measurable change in the received amplitude may be sufficient for the system 70 to determine that the sensors environment has changed from air to water and vice versa.

Figure 1C:
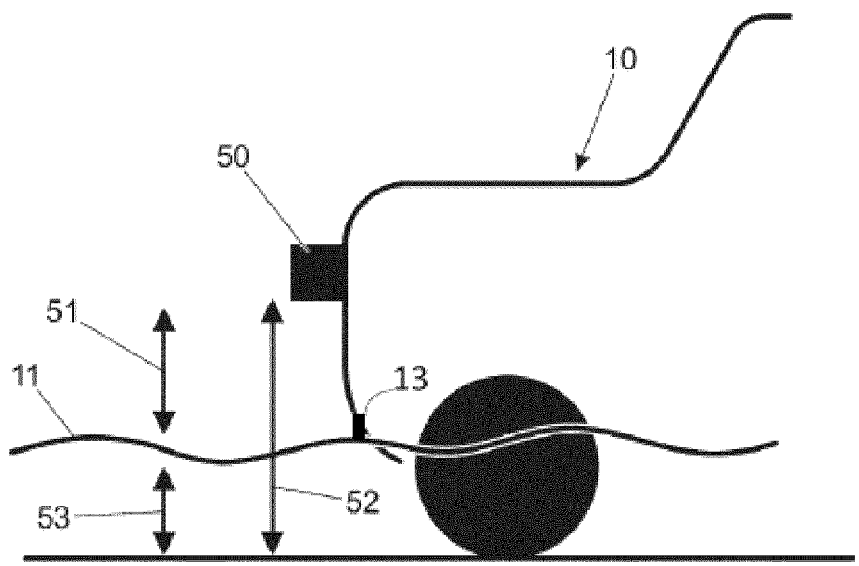
FIG. 1C is a schematic illustration of a vehicle having a system for indicating that a vehicle is in a wading situation and for estimating wading depth, optionally using a substantially downward facing ultrasonic transmitter and receiver.

FIG. 1C illustrates a vehicle 10 having a system 70 entering water having a surface 11 and on an inclined slope 12. An ultrasonic sensor 13 on the front bumper 40 exhibits a change in response when entering water 21, and thus serves as an indicator that the vehicle 10 is in a wading situation.

The sensor 13 may include a vibrating diaphragm for emitting and/or receiving an ultrasound pulse. When used for parking distance control such a sensor can estimate the distance to an object by measuring the time of flight of the echoed signal pulse. The time of flight is the time between the sound wave being emitted and being received (having been reflected off the surface of the detected object). Dividing the time-of-flight by two and using the velocity of sound in air, the distance between the vehicle and the object can be determined. A further aspect of the present invention provides a system 70, that upon detecting (using the sensors 13a, 13b, 13c, 13d as described above) that the vehicle is in a wading situation can continue to effectively utilise a parking distance sensor 13. The system 70 is configured to calibrate itself for operation in water (optionally the system 70 may based upon measured time-of-flight information call a different algorithm to calculate the distance to an object that uses the speed of sound in water, rather than the speed of sound in air to calculate the object's distance).

Parking distance sensors can be used for the invention and also for parking distance control. Such sensors may however be immersion detectors only, and may be mounted out of sight, for example with a bumper shell at an appropriate height.

As a further optional aspect of the invention, the vehicle 10 may comprise one or more tilt sensors 14 which give to the vehicle control system such as the processing unit 72, an indication of fore and aft inclination labelled in the drawings as a and reference numeral 15.

Figure 2:
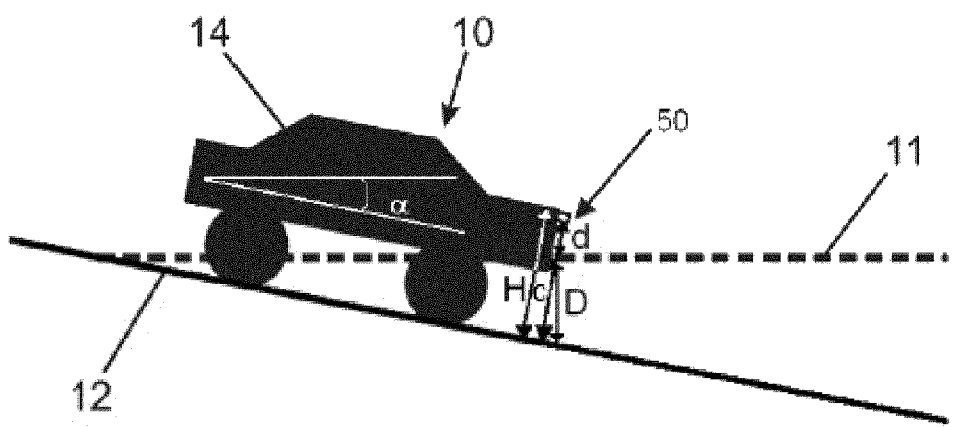
FIGS. 2 and 7 are a schematic illustrations of a vehicle having a system for estimating the depth of water in which the vehicle is positioned, using information about the attitude or inclination of the vehicle and utilising a substantially downward facing sensor.

FIGS. 1C and 2 illustrate a vehicle 10 having a system 70 for estimating the depth of water in which the vehicle 10 is wading. A system 70, as illustrated in FIG. 1C, may optionally comprise a substantially downward facing sensor 50 that may optionally comprise a signal emitter and a signal receiver (for example a transducer). The system 70 also comprises a control unit (not shown in FIG. 1C) configured to monitor electrical signals transmitted and received by the one or more sensors 50. Further optionally the sensor 50 may be an ultrasonic transducer capable of emitting and receiving pulses of ultrasound.

The control unit may be configured to at least receive electrical signals issued by the sensor 50 and process them. The control unit may additionally be configured to issue electrical signals to the sensor 50 to control it. Optionally the system 70 may comprise more than one sensor 50. The sensor 50 may optionally be or include transducers (that can optionally convert acoustic signals to electrical signals and vice versa) that may preferably, but nevertheless optionally, be ultrasonic transducers. A single sensor 50 may be provided on the front of the vehicle 10 and a single sensor 50 may be provided on the rear of the vehicle 10. Whereas it is advantageous to position the sensor 50 at a leading edge of the vehicle 10 in order to obtain an earliest measurement of wading depth, it is also envisaged that in other embodiments of the invention the system may comprise one or more sensors positioned inward of a leading edge of a vehicle, for example on a lowermost surface of each of the wing mirrors of the vehicle 10.

Whereas the system 70 is suitably arranged with only one substantially downward facing sensor 50, it will be understood that a greater number of sensors 50 may be used in other embodiments. Optionally two sensors may be provided. The arrangement of the one or more sensors 50 may be used to provide additional information about topography of the surface upon which the vehicle 10 is driving. In other embodiments, the one or more sensors 50 may be arranged in a non-linear configuration and/or may be positioned at more than one height about the vehicle 10; and/or may be disguised or occluded from normal view for stylistic and/or other purposes. In use, the one or more sensors 50 are preferably downward facing, but may be moveable from a stowed position into a use position where they are substantially downward facing.

Furthermore, whereas the present embodiment is described as utilising ultrasonic transducers it will be understood from reading the foregoing that other suitable types of sensor or transducer may be used in alternative envisaged embodiments. For example, other ranges of acoustic transducer sensor such as an audible sound wave transducer may be used. It will be understood that other types of sensor may be suitable in replacement of or in conjunction with an ultrasonic sensor, for example, other acoustic, but non-ultrasonic sensors, an electromagnetic sensor optionally utilising an LED for emission of an infra-red signal and a photodiode for receiving a portion of the infra-red signal reflected from a surface.

The terms ultrasound and ultrasonic are used synonymously in the foregoing to mean sound waves or acoustic signals of a frequency that is outside of the typical human-hearing range, optionally taken to be greater than about 20 kHz and further optionally about 50 kHz. It will be understood that the present invention may be effectively employed using sonic sensors that emit and receive sound waves at frequencies lower than 20 kHz.

Ultrasonic sensors such as those currently used for parking distance control (PDC) typically comprise a diaphragm that can oscillate or vibrate that is disposed to face out from a vehicle bumper; a piezoelectric element positioned behind the diaphragm; and an integrated circuit. The same diaphragm may be used to emit an ultrasonic signal (in the form of sound waves) and receive an ultrasonic signal. The emission of ultrasonic signals, waves or pulses is typically controlled by the integrated circuit, which may optionally issue electrical signals to an electronic control unit for processing. In normal use as a parking sensor, the timing difference between the transmission of an ultrasonic pulse and receipt of a reflection of that same ultrasonic pulse can be used to measure the range or distance between the vehicle and an object in the vehicle path.

FIG. 1C illustrates schematically the vehicle 10 having a bonnet or front grille mounted downward facing ultrasonic transducer sensor 50, such as those used as parking distance control sensors. The sensor 50 in FIG. 1C and the sensor 50 in FIG. 2 are each configured to emit a signal or pulse of ultrasound and detect an echo of that signal. The echo is a reflection of the signal from a nearby surface and the time of flight of the signal to the surface and back can be used to calculate a distance d, 51 between the sensor 50 and the surface 11, which may be the surface of water 11 in which the vehicle 10 is wading.

The mounting height or in-use position H, 52 of the sensor 50 is a known parameter and may be stored in a memory associated with the control unit of the system 70. The control unit, knowing the mounting height or in-use height 52, H of the sensor 50 and the distance d between that sensor and a surface 11 (optionally determined by dividing the time taken by a signal to be returned to the sensor 50 by two and multiplying it by the speed of that signal in air) the depth of water 53, D can be calculated as follows (see also FIG. 1C):

$$D=H-d$$

A look-up table may give a mounting height or in-use height H, 52 associated with a vehicle suspension height setting (referred to as a ride height). A test mode may be provided for calibrating the mounting height on dry land, notwithstanding that the sensor 50 optionally may only be enabled whilst the vehicle is in a wading situation. Optionally, the control unit may determine, in real-time, the in-use position H of the sensor 50 by adjusting, a normal value H of the mounted height, by a correction for the ride height r of the vehicle.

In FIG. 1C a wading event indicator sensor 13 is disposed on the vehicle 10 at a location of height, h, 53, which is preferably, but nevertheless optionally at a lower height than the height H of the substantially downward facing sensor 50. It is desirable for the wading event indicator sensor 13 to be mounted as low as possible so that an earlier indication of the presence of water in the path of the vehicle 10 can be given. According to an optional aspect, the wading event indicator sensor 13 may be an ultrasonic sensor, optionally disposed on the front bumper and may exhibit a change in response (as described above and in co-pending applications that are incorporated herein by a reference provided at the end of the description) when entering water, and thus may provide an indication of the vehicle being in a wading situation.

Figure 7:
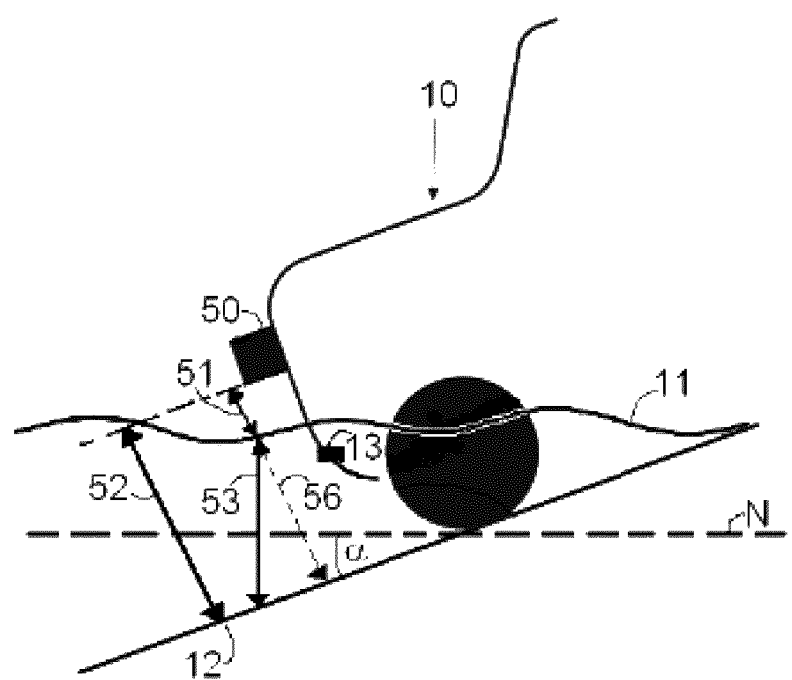

FIGS. 2 and 7 illustrate a vehicle 10 on an inclined surface 12 and entering water having a surface 11. The system 70 may comprise or utilise one or more tilt sensors 14 provided on the vehicle 10 which may be used by the control unit of the system to at least approximate an indication of fore and aft inclination α, 15. As illustrated in FIG. 2, the system 70 may be configured to approximate the depth of liquid in which the vehicle 10 is wading, again by using the distance d (as determined by the sensor 50 and system 70) between that sensor 50 and the surface 11; the known height H of the sensor 50 in use; the angle α of inclination and optionally the following relationship:

$$D = \frac{(H-d)}{\cos(\alpha)},$$

FIG. 7 illustrates a vehicle 10, not level, but on an incline 12. Information, optionally from a fore and aft tilt sensor 14 may provides vehicle inclination, and thus a correction factor 56 for the water depth calculation. Correction factor 56 is equivalent to H-d and can be used in the equation above in replacement of the terms H-d. It will be understood that the format of an algorithm used to carry out the computations required may be varied to accommodate various programming languages and other requirements; as such the implementation of various aspects of the invention may be done in many and various ways.

Figure 3A:
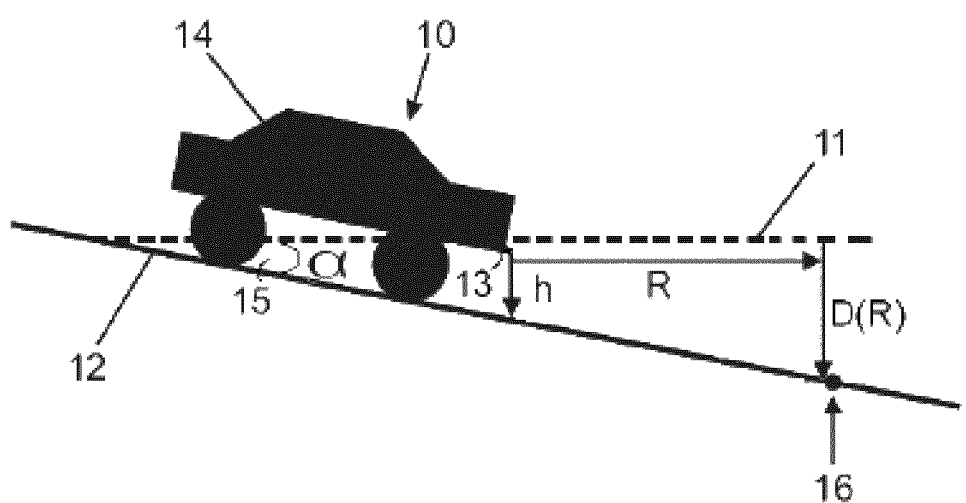
FIG. 3A is a schematic illustration of a vehicle having a system for indicating that a vehicle is in a wading situation and for estimating the depth of water ahead of the vehicle using information about the attitude or inclination of the vehicle.

Referring now to FIG. 3A, it is illustrated how a system 70 installed on the vehicle 10 is configured to and can be used to predict water depth at a substantially linear distance R ahead of the vehicle 10. The calculation, prediction or estimation of depth ahead of the vehicle 10 may be carried out immediately upon the system 70 realising by use of the wading event indication sensor 13 that the vehicle 10 is in water. As such an early prediction of ahead depth D(R) may be made using the height h of the wading event indication sensor 13 as an estimation of the current water depth and the following equation:

$$D(R) = R \cdot \text{Tan}(\alpha) + h$$

Wherein, h is the mounting height or in-use height of a wading indicator sensor. It will be appreciated that the value of h may be fixed in relation to actual sensor height above ground in the horizontal vehicle condition, or according to a vehicle suspension height setting. A more accurate calculation of h may take into account vehicle inclination α so as to give the true vertical dimension when the vehicle is inclined.

Figure 3B:
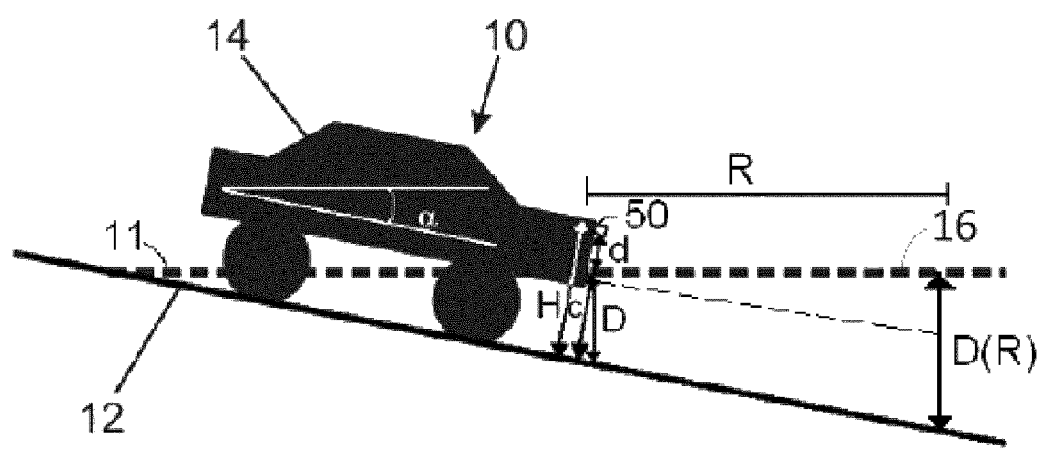
FIG. 3B is a schematic illustration of a vehicle having a system for estimating predictive vehicle wading depth optionally using a substantially downward facing ultrasonic transmitter and receiver.

Further optionally, and with reference to FIG. 3B, the following equation may be used to calculate a depth of water (or other liquid such as muddy water) D(R), at a distance R ahead of the current vehicle 10 position using a more accurate estimation of the depth of water D that the vehicle 10 is currently in (as calculated above for example, see FIGS. 2 and 7):

$$D(R) = R \cdot \text{Tan}(\alpha) + D$$

Where D(R) is the estimated depth; R is the distance to the point of estimation 16, which may for example be 1 meter; α is the angle of inclination; and D is the depth of water that the vehicle 10 is already in. D may be calculated as described above.

Whereas, in an optional embodiment of the system 70, the prediction assumes that the angle of inclination α is constant, the prediction may be updated in real-time using a real-time signal feed of measured inclination angle α.

Figure 4:
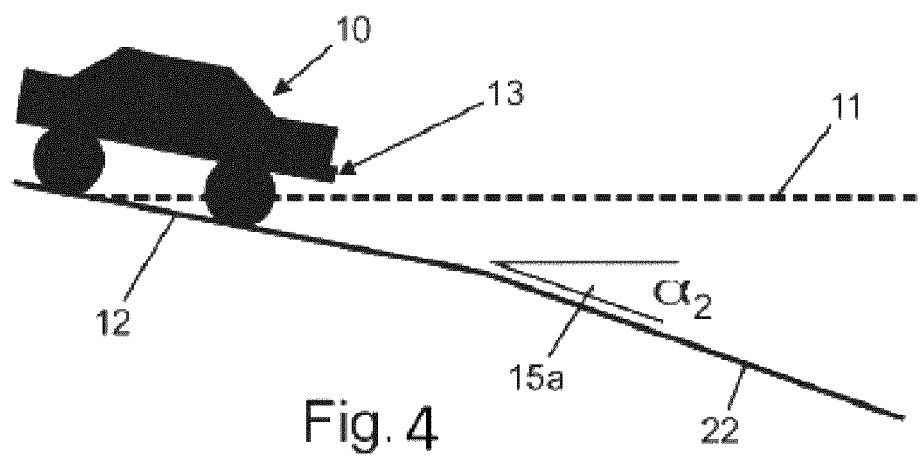
FIG. 4 illustrates the vehicle and system of FIG. 3 in a situation where there is a variation of the slope of inclination of the ground surface upon which the vehicle is travelling.

FIG. 4 illustrates an embodiment where the angle of inclination 15a increases in the forward path of the vehicle to give an increased slope 22. The control system of the vehicle 10 may monitor a change in angle of inclination α so as to indicate increasing slope. By the system 70 repeatedly conducting a prediction of the ahead range of the vehicle (either recalculating when α changes, or intermittently recalculating when α is measured) more accurate estimation of the point at which the vehicle may reach a maximum wading depth can be made.

Figure 5:
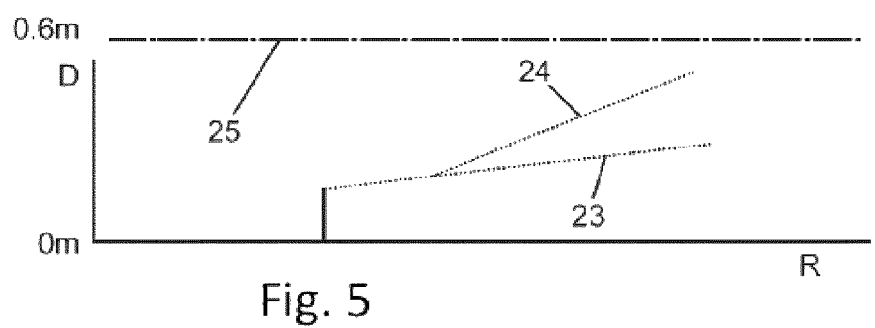
FIG. 5 illustrates graphically the change in slope illustrated in FIG. 4.

FIG. 5 illustrates graphically a path estimation of the vehicle 10 according to successive increasing angles of inclination 23, 24 and a maximum wading depth 25 of 0.6 m.

Figure 6:
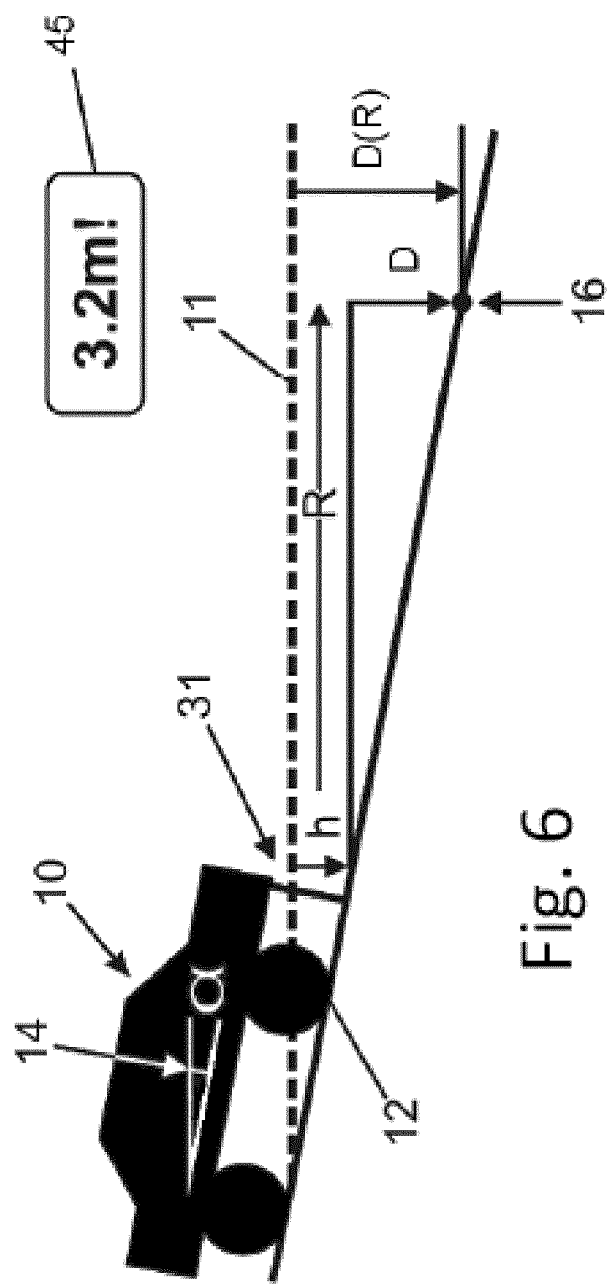
FIG. 6 further illustrates a system comprising a sensor for use in estimating a maximum distance that the vehicle may be able to travel based upon a maximum wading depth of the vehicle.

FIG. 6 illustrates a vehicle having a device 31 (shown schematically) for measuring depth of water. Any suitable device may be used; in particular a bonnet mounted downward facing ultrasonic sensor.

Continual measurement of actual immersion depth D may be made and compared with a maximum wading depth $D_{max}$ of the vehicle 10. Depth estimation ahead of the vehicle 10 may be carried out for single distance R ahead of the vehicle, for example 1 m, or at a number of discrete points, for example 50 points at 100 mm intervals.

Alternatively, or additionally, the system 70 may be configured to estimate a distance $R_{max}$ ahead of the vehicle at which it is estimated the maximum wading depth $D_{max}$ may be reached. This may be calculated by:

$$\frac{D_{max} - D}{\text{Tan}(\alpha)} = R_{max}$$

Wherein α is the current angle of slope inclination and D is the current wading depth. The distance to maximum wading depth may be presented to the driver in the form of a dashboard warning 45, in analogue or digital form.

Information, data or signals from any of the sensors, 13, 14, 50 concerning water presence, water depth and tilt angle may be transmitted to a control unit or processor of the system 70 by a vehicle Bus system and/or via a vehicle controller area network (CAN).

The system 70 may be provided with a water surface sensor 50 and/or one or more water indication sensors 13 on the rear of the vehicle 10 and as such the afore described detection of wading; estimation of current wading depth and prediction of ahead wading depth may equally to forwards and reverse vehicle 10 movement, optionally using sensors at the leading edge of the vehicle.

A downward facing ultrasonic sensor 50 may be provided at the front of the vehicle, for example centrally in the radiator grill or on the bonnet, or at the side (for example on a lower surface of the wing mirrors) optionally provided that it has an output cone projecting beyond the vehicle front or rear wheels. Thus a sensor may be provided at the side and/or within the external body panels so long as a clear forward and downward line of sight is maintained. The height H, 52 of the depth measurement sensor 50 may be determined by vehicle body design and the maximum wading depth for which the sensor is intended to be operable.

It is envisaged that in other embodiments, the system 70 may comprise one or more sensors 50 that are angled non-perpendicularly toward a water surface 11, where this is the case, the algorithm executed by a processing unit of the system 70 may incorporate a further step to improve the accuracy of the value of d (the distance between the sensor 50 and the water surface 11) determined from the time of flight measured.

In the foregoing the term downwardly has been used to describe an optional position or orientation of the sensor 50. It will be understood that downwardly may mean perfectly normal, substantially normal, within about 0 to about 20° off normal.

The wading depth sensor may be activated automatically, or on demand by the driver. A driver override may be provided. The system of wading and/or depth sensing may be operational only below a pre-determined wading speed, and the vehicle speed may be limited to a pre-set maximum during wading.

It will be understood from the foregoing that the system 70 and its control unit may estimate, approximate or predict a depth of water in which the vehicle is wading or may wads in a number of ways. Exemplary calculations have been described, however, it is envisaged that many and various other ways for approximating or determining current or ahead wading depth will be suitable for use by a system 70 according to the invention. For example, any of the trigonometric functions mentioned in the above equations may be approximated by a fixed value or a series expansion may be computed to determine the value (such as a Taylor or Euler Series Expansion); further optionally, predefined values for each or any suitable term in the above described relationships may be listed in a look-up table (if appropriate) to be referenced during the computation of an estimation of wading depth. Additionally, or alternatively, or in combination, any of the trigonometric functions may be substituted in order to simplify the computation (and thereby optionally reduce the processing time needed in order to compute the compensation). It is envisaged that any of the trigonometric functions listed in the above equations may be computed by using an expansion series such as a Taylor Expansion Series or if appropriate an Euler Expansion Series and/or predetermined and listed in a reference or look-up table. The values, if provided in a look-up table may be linearly interpolated, quadratically interpolated, exponentially interpolated or interpolated using any other suitable mathematical method that would provide a suitable approximate value for the trigonometric function being interpolated.

Furthermore it will be understood that the order in which certain terms are computed may be adjusted to other embodiments of the invention and that a combination of calculation and/or referencing and/or approximation may be used for any or all of the relationships adapted to improve the accuracy of the detected variable.

Additionally it will be understood that other suitable devices may be utilised by a system 70 according to the invention to measure the depth D of water in which a vehicle 10 may be wading. As such the use of a downward facing sensor 50 is entirely optional. Other optional depth measurement devices that may be suitable for use in the system may be used and the depth measurement provided by one or more of them used in a computation of the distance at which maximum wading depth is likely to be reached or in the computation of the depth D(R) at a distance R ahead of the vehicle.

In the foregoing the term ahead has been used to refer to the path in front of the vehicle in its direction of travel. It will be understood that this may not be limited to exactly parallel with the line of travel of the vehicle.

The present application claims priority to UK patent application numbers filed by the present applicant on 15 Dec. 2010 having the application numbers: GB1021268.6, GB1021278.5, GB1021272.8, GB1021297.5, GB1021295.9 and GB1027296.7, the contents of each of which are expressly incorporated herein, by reference, in their entirety.

The present application is related to the PCT applications, filed concurrently with the present application, and naming at least one inventor in common with the present application, which are listed below:

1. PCT application No. PCT/EP2011/072998 to Thuy-Yung TRAN and Edward HOARE filed 15 Dec. 2011, entitled "Ultrasonic Wading Detection System for a Vehicle";
2. PCT application No. PCT/EP2011/072986 to Thuy-Yung TRAN, Edward HOARE and Nigel CLARKE, filed 15 Dec. 2011, entitled "Vehicle Control System";
3. PCT application No. PCT/EP2011/072997 to Thuy-Yung TRAN, Edward HOARE and Nigel CLARKE, filed 15 Dec. 2011, entitled "Wading Depth Estimation for a Vehicle";
4. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";
5. PCT application No. PCT/EP2011/072990 to Thuy-Yung TRAN, Edward HOARE and Nigel CLARKE, filed 15 Dec. 2011, entitled "Vehicle Orientation Device and Method";
6. PCT application No. PCT/EP2011/072991 to Thuy-Yung TRAN, Edward HOARE and Nigel CLARKE, filed 15 Dec. 2011, entitled "Wading Vehicle Depth Measurement Apparatus";
7. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";
8. PCT application No. PCT/EP2011/072994 to Thuy-Yung TRAN, Edward HOARE, Anthony JONES, Simon THOMSON and Ashutosh TOMAR, filed 15 Dec. 2011, entitled "Wading Vehicle Water Level Display";
9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display";

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A wading detection system for a vehicle comprising:
a plurality of parking sensors spaced apart from one another and disposed on at least one of a front or a rear of said vehicle, at least a first of said plurality of parking sensors operable as a sound wave pulse emitter device and at least a second of said plurality of parking sensors operable as a
sound wave pulse receiver device said at least second of said plurality of parking sensors configured to receive sound pulses emitted by said at least first of said plurality of parking sensors; and
an electronic controller comprising a memory and a processor configured to receive signals from said at least second of said plurality of parking sensors, said controller being configured to measure one or more of the following variables:

(i) the time of flight of a sound pulse between said at least first and said at least second of said plurality of parking sensors;

(ii) the amplitude of a sound pulse emitted by said at least first of said plurality of parking sensors when received by said at least second of said plurality of parking sensors; and (iii) the wavelength of a sound pulse emitted by said at least first of said plurality of parking sensors when received by said at least second of said plurality of parking sensors, wherein the electronic controller is configured to act upon one or more signals received from said at least second of said plurality of parking sensors to determine whether the medium between said at least first and said at least second of said plurality of parking sensors is air or liquid.

2. A system according to claim 1 wherein said at least first of said plurality of parking sensors and said at least second of said plurality of parking sensors are each ultrasonic transducer devices, each configured to emit an ultrasound pulse and each configured to receive an ultrasound pulse.

3. A system according to claim 2, wherein said at least first of said plurality of parking sensors and said at least second of said plurality of parking sensors are configured to operate at different frequencies, so as to permit the sound wave pulse emitted by said at least first of said plurality of parking sensors to be distinguished from the sound wave pulse emitted by another of said plurality of parking sensors operable as a sound wave pulse emitter device.

4. A system according to claim 1, wherein the electronic controller acts upon said received signal(s) to determine whether the medium is air or liquid by one or more of: comparing the one or more measured variables with a value or range of values expected for said one or more variables if the medium is air; and by comparing the one or more measured variables with a value of range of values expected for said one or more variables if the medium is liquid, and when it is determined that the medium is liquid, the electronic controller outputs a signal indicative of said medium being a liquid.

5. A system according to claim 4, wherein the value expected, of the time of flight of a sound pulse between said at least first of said plurality of parking sensors and said at least second of said plurality of parking sensors, if the medium is liquid, is between about 3 and about 5 times less than the value of the time of flight expected if the medium is air.

6. A system according to claim 4, wherein the value expected of the wavelength of a sound pulse emitted by said at least first of said plurality of parking sensors when received by said at least second of said plurality of parking sensors, if the medium is liquid is between about 3 and about 5 times greater than the value of the wavelength expected if the medium is air.

7. A system according to claim 4, wherein the electronic controller is configured to recall or reference the expected values of the said one or more variables from the memory associated with the electronic controller.

8. A system according to claim 1, wherein said at least first of said plurality of parking sensors and said at least second of said plurality of parking sensors each transmit and receive in use, and wherein said electronic controller is configured to measure time of flight of a sound pulse in both directions.

9. A system according to claim 1, wherein relative positions of said at least first of said plurality of parking sensors and said at least second of said plurality of parking sensors are selected from the group comprising: disposed such that they face one another; disposed such that they both face out from a common plane; and disposed adjacent to one another.

10. A vehicle comprising a system according to claim 1.

11. A vehicle according to claim 10 wherein said at least first of said plurality of parking sensors and said at least second of said plurality of parking sensors are each ultrasonic transducer devices, each configured to emit an ultrasound pulse and each configured to receive an ultrasound pulse and wherein the system comprises two series of ultrasonic transducers, a first series being disposed across the front of the vehicle and a second series being disposed across the rear of the vehicle.

12. A vehicle according to claim 11 wherein the first and second series of ultrasonic transducers are each operable simultaneously, in conjunction with the electronic controller, as parking distance control sensors and wading situation sensors.

13. A vehicle according to claim 11 wherein each of said first and second series of ultrasonic transducers is distributed across the vehicle and the location of each ultrasonic transducer within the first and second series of ultrasonic transducers is known by the electronic controller, by being stored in a memory associated with the electronic controller and/or by being provided on a program executed by the electronic controller, such that the electronic controller is configured to determine that only a portion of the vehicle may be disposed in a liquid; to determine which portion of the vehicle that may be; and to approximate an inclination of the vehicle.

14. A vehicle according to claim 11 wherein the system for detecting wading is configured to repeatedly measure said one or more variables and is configured to determine that the medium between two or more ultrasonic transducers has changed from being a liquid to being air.

15. A system according to claim 1, wherein determining whether the medium between said at least first of said plurality of parking sensors and said at least second of said plurality of parking sensors comprises determining whether at least one of said at least first of said plurality of parking sensors and said at least second of said plurality of parking sensors is immersed in liquid.

16. A system according to claim 1, wherein said at least first of said plurality of parking sensors and said at least second of said plurality of parking sensors are separately mounted to the vehicle.

17. A system for detecting wading of a vehicle comprising:
at least one sound wave pulse emitter device;
at least one sound wave pulse receiver device spaced apart from the at least one sound wave pulse emitter device and configured to receive sound pulses emitted by the at least one sound wave pulse emitter device;
an electronic controller comprising a memory and a processor configured to receive signals from the at least one sound wave pulse receiver device, said controller being configured to measure one or more of the following variables:

(i) the time of flight of a sound pulse between the at least one sound wave pulse emitter device and the at least one sound wave pulse receiver device;

(ii) the amplitude of a sound pulse emitted by the at least one sound wave pulse emitter device when received by the at least one sound wave pulse receiver device; and (iii) the wavelength of a sound pulse emitted by the at least one sound wave pulse emitter device when received by the at least one sound wave pulse receiver device, wherein the electronic controller is configured to act upon one or more signals received from the sound wave pulse receiver device to determine whether the medium between the at least one sound wave pulse emitter device and the at least one sound wave pulse receiver device is air or liquid;

a depth sensor; and a tilt sensor configured to indicate a vehicle fore and aft inclination, wherein said electronic controller configured to predict depth of water at a pre-determined distance in advance of the vehicle, and wherein said depth sensor comprises a substantially downward facing ultrasonic emitter device and a substantially downward facing ultrasonic receiver device configured to determine the distance between the depth sensor and a surface.

18. A system according to claim 17, wherein said electronic controller is configured automatically to cause the depth sensor to operate only when the medium between the at least one sound wave pulse emitter device and the at least one sound wave pulse receiver device is determined to be liquid.

19. A method of operating a wading detection system of a vehicle having a plurality of parking sensors spaced apart from one another and disposed on at least one of a front or a rear of said vehicle, comprising:
  (i) emitting a sound wave pulse from at least a first of said plurality of parking sensors operable as a sound wave pulse emitter device disposed on the vehicle at a wading height;
  (ii) receiving said sound wave pulse using at least a second of said plurality of parking sensors operable as a sound wave pulse receiver device and configured to receive sound wave pulses emitted by said at least first of said plurality of parking sensors, said at least second of said plurality of parking sensors disposed on the vehicle at a wading height;
  (iii) measuring one or more of the following variables:
    (a) the time of flight of a sound pulse between said at least first of said plurality of parking sensors and said at least second of said plurality of parking sensors;
    (b) the amplitude of a sound pulse emitted by said at least first of said plurality of parking sensors when received by said at least second of said plurality of parking sensors; and
    (c) the wavelength of a sound pulse emitted by said at least first of said plurality of parking sensors when received by said at least second of said plurality of parking sensors; and
  (iv) comparing the one or more measured variables with a value or range of values expected for said one or more variables if a medium between said at least first of said plurality of parking sensors and said at least second of said plurality of parking sensors is air and/or by comparing the one or more measured variables with a value or range of values expected for the one or more variables if the medium is liquid.

20. A method according to claim 19, wherein said receiving step comprises receiving said sound wave pulse using said at least second of said plurality of parking sensors that is separately mounted to the vehicle from said at least first of said plurality of parking sensors.

21. A non-transient computer readable memory having stored thereon a program for a computer executable by an electronic controller of a wading detection system of a vehicle, said system comprising a plurality of parking sensors spaced apart from one another and disposed on at least one of a front or a rear of said vehicle, at least a first of said plurality of parking sensors operable as a sound wave pulse emitter device and at least a second of said plurality of parking sensors operable as a sound wave pulse receiver device and configured to receive sound wave pulses emitted by said at least first of said plurality of parking sensors, to carry out at least the steps of:
  measuring one or more of the following variables:
    (a) the time of flight of a sound pulse between said at least first of said plurality of parking sensors and said at least second of said plurality of parking sensors;
    (b) the amplitude of a sound pulse emitted by said at least first of said plurality of parking sensors when received by said at least second of said plurality of parking sensors; and
    (c) the wavelength of a sound pulse emitted by said at least first of said plurality of parking sensors when received by said at least second of said plurality of parking sensors; and
  one or more of: comparing the one or more measured variables with a value or range of values expected for said one or more variables if a medium between said at least first of said plurality of parking sensors and said at least second of said plurality of parking sensors is air; and comparing the one or more measured variables with a value or range of values expected for the one or more variables if the medium is liquid.

22. A method of indicating wading of a vehicle fitted with a plurality of ultrasonic emitter/receiver devices, the method comprising:
  (i) determining the time of flight in air of an ultrasonic signal from one of said ultrasonic emitter/receiver devices to another one of said ultrasonic emitter/receiver devices;
  (ii) repeatedly checking the time of flight when said devices are enabled,
  (iii) detecting a substantially reduced time of flight; and
  (iv) providing an input to a vehicle control system indicative of said substantially reduced time of flight, so as to indicate partial immersion of the vehicle in water.

* * * * *